United States Patent
Tatsuzawa et al.

(10) Patent No.: US 8,842,187 B2
(45) Date of Patent: Sep. 23, 2014

(54) IMAGE PROCESSING DEVICE, IMAGE PROCESSING METHOD, AND SOLID-STATE IMAGING DEVICE

(71) Applicant: Kabushiki Kaisha Toshiba, Tokyo (JP)

(72) Inventors: Yukiyasu Tatsuzawa, Kanagawa (JP); Kazuhiro Hiwada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/752,667

(22) Filed: Jan. 29, 2013

(65) Prior Publication Data
US 2013/0222620 A1    Aug. 29, 2013

(30) Foreign Application Priority Data
Feb. 24, 2012    (JP) .................................. 2012-038652

(51) Int. Cl.
H04N 5/228 (2006.01)
H04N 5/235 (2006.01)
G06K 9/40 (2006.01)
G06K 9/46 (2006.01)
H04N 5/232 (2006.01)

(52) U.S. Cl.
CPC ......... H04N 5/23254 (2013.01); H04N 5/2355 (2013.01)
USPC .............. 348/208.99; 348/208.4; 348/208.12; 348/208.6; 382/255; 382/236

(58) Field of Classification Search
USPC ........... 348/222.1, 221.1, 362, 208.99, 229.1, 348/208.4, 208.1, 208.12, 208.13, 208.16, 348/241, 243, 154, 155; 382/262, 263, 264, 382/255, 107, 236
See application file for complete search history.

(56) References Cited

U.S. PATENT DOCUMENTS

| | | | |
|---|---|---|---|
| 7,916,177 B2 | 3/2011 | Motomura et al. | |
| 2008/0143841 A1 | 6/2008 | Tico et al. | |
| 2010/0079630 A1* | 4/2010 | Mishima et al. | 348/248 |
| 2010/0231731 A1* | 9/2010 | Motomura et al. | 348/208.4 |

FOREIGN PATENT DOCUMENTS

| | | |
|---|---|---|
| JP | 2868915 | 12/1998 |
| JP | 2007-306447 | 11/2007 |
| JP | 2007-324770 | 12/2007 |
| JP | 2008-236739 | 10/2008 |
| JP | 2009-010917 | 1/2009 |
| JP | 2011-4282 | 1/2011 |
| WO | 2009/019848 A1 | 2/2009 |

OTHER PUBLICATIONS

Office Action issued Jun. 3, 2014 in Japanese Patent Application No. 2012-038652 (with English Translation).

* cited by examiner

*Primary Examiner* — Tuan Ho
*Assistant Examiner* — Marly Camargo
(74) *Attorney, Agent, or Firm* — Oblon, Spivak, McClelland, Maier & Neustadt, L.L.P.

(57) ABSTRACT

According to an embodiment, a high dynamic range synthesizing circuit includes an interpolation processing unit, a blur detection unit and a mix processing unit. The interpolation processing unit generates an interpolation signal. The blur detection unit uses a first image signal and a second image signal a signal level of which is adjusted for detecting the amount of blur. The mix processing unit performs processing of mixing the second image signal into the interpolation signal. The mix processing unit applies a weight of the second image signal depending on the amount of blur to the interpolation signal by the mix processing.

20 Claims, 10 Drawing Sheets

FIG.3

| Gr | R | Gr | R | Gr | R | Gr | R |
|----|---|----|---|----|---|----|---|
| B  | Gb| B  | Gb| B  | Gb| B  | Gb|
| Gr | R | Gr | R | Gr | R | Gr | R |
| B  | Gb| B  | Gb| B  | Gb| B  | Gb|
| Gr | R | Gr | R | Gr | R | Gr | R |
| B  | Gb| B  | Gb| B  | Gb| B  | Gb|
| Gr | R | Gr | R | Gr | R | Gr | R |
| B  | Gb| B  | Gb| B  | Gb| B  | Gb|

FIG.5
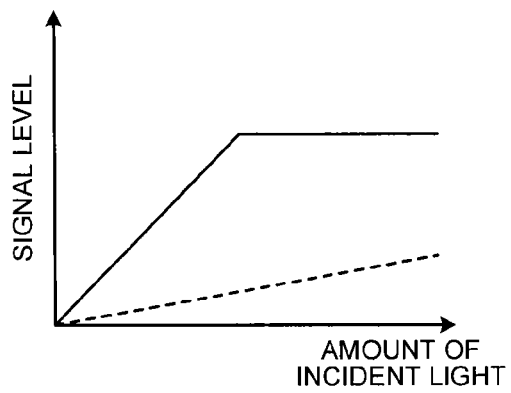
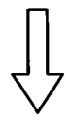
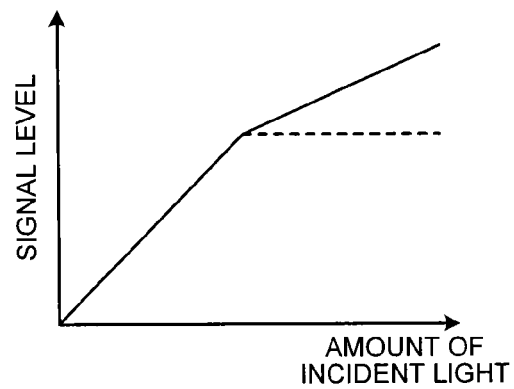
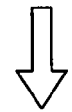
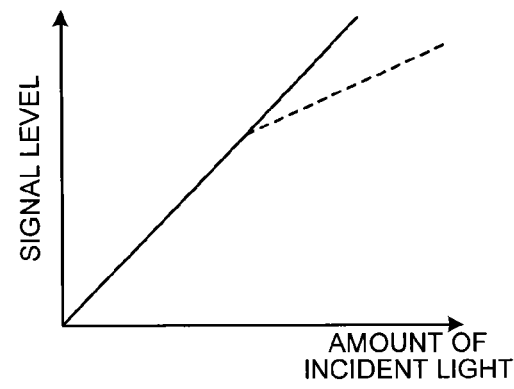

FIG.8

|    |     |     |     |     |
|----|-----|-----|-----|-----|
| L4 | P41 |     | P43 |     | P45 |
| L3 |     |     |     |     |     |
| L2 | P21 |     | P23 |     | P25 |
| L1 |     |     |     |     |     |
| L0 | P01 |     | P03 |     | P05 |

IMAGE PROCESSING DEVICE, IMAGE PROCESSING METHOD, AND SOLID-STATE IMAGING DEVICE

CROSS-REFERENCE TO RELATED APPLICATIONS

This application is based upon and claims the benefit of priority from Japanese Patent Application No. 2012-038652, filed on Feb. 24, 2012; the entire contents of all of which are incorporated herein by reference.

FIELD

Embodiments described herein relate generally to an image processing device, an image processing method and a solid-state imaging device.

BACKGROUND

High dynamic range (HDR) synthesis is known as an imaging technique configured to express a wider dynamic range than normal imaging. As a HDR synthesizing method, two or more acquired images with mutually different amounts of exposure (charge accumulating times) are synthesized, for example. With the method, a delay occurs in a frame rate of the synthesized image relative to an output cycle by an image sensor. Thus, particularly when a moving image is captured, there is a problem that a blur (motion blur) easily occurs in an object image.

As other HDR synthesizing method, two lines with mutually different charge accumulating times are paired and signal charges of the pixels with different charge accumulating times are added per pair, for example. With the method, a resolution in the direction perpendicular to the lines is substantially half of that in a normal case, and thus the image quality is deteriorated.

BRIEF DESCRIPTION OF THE DRAWINGS

FIG. 3 is a diagram for explaining an arrangement of pixels in an image sensor;

FIG. 5 is a diagram for explaining output characteristics of a long-time exposed pixel and a short-time exposed pixel, and a synthesis of image signals by the HDR synthesizing circuit;

FIG. 8 is a diagram for explaining target pixels at the same time on the horizontal delay line;

DETAILED DESCRIPTION

In general, according to an embodiment, an image processing device includes a high dynamic range synthesizing circuit. The high dynamic range synthesizing circuit synthesizes a first image signal and a second image signal. The first image signal is an image signal depending on the amount of incident light into a first pixel during a first charge accumulating period. The second image signal is an image signal depending on the amount of incident light into a second pixel during a second charge accumulating period. The second charge accumulating period is shorter than the first charge accumulating period. The high dynamic range synthesizing circuit includes a signal level adjustment unit, an interpolation processing unit, a blur detection unit, and a mix processing unit. The signal level adjustment unit adjusts a signal level of the second image signal depending on the ratio between the first charge accumulating period and the second charge accumulating period. The interpolation processing unit is input with the first image signal and the second image signal whose signal level is adjusted in the signal level adjustment unit. The interpolation processing unit generates an interpolation signal. The blur detection unit detects the amount of blur occurring in an object image. The blur detection unit uses, for detecting the amount of blur, the first image signal and the second image signal whose signal level is adjusted in the signal level adjustment unit. The mix processing unit performs processing of mixing the second image signal into the interpolation signal. The mix processing unit applies a weight of the second image signal depending on the amount of blur to the interpolation signal via the mix processing. The interpolation processing unit generates the interpolation signal by interpolation processing using the second image signals from the second pixels as peripheral pixels for the first pixel as a target pixel. The interpolation processing unit generates the interpolation signal by interpolation processing using the first image signals from the first pixels as peripheral pixels for the second pixel as a target pixel. The peripheral pixels are positioned around the target pixel.

The image processing device, the image processing method and the solid-state imaging device according to the embodiment will be described below in detail with reference to the accompanying drawings. The present invention is not limited to the embodiment.

Figure 1:
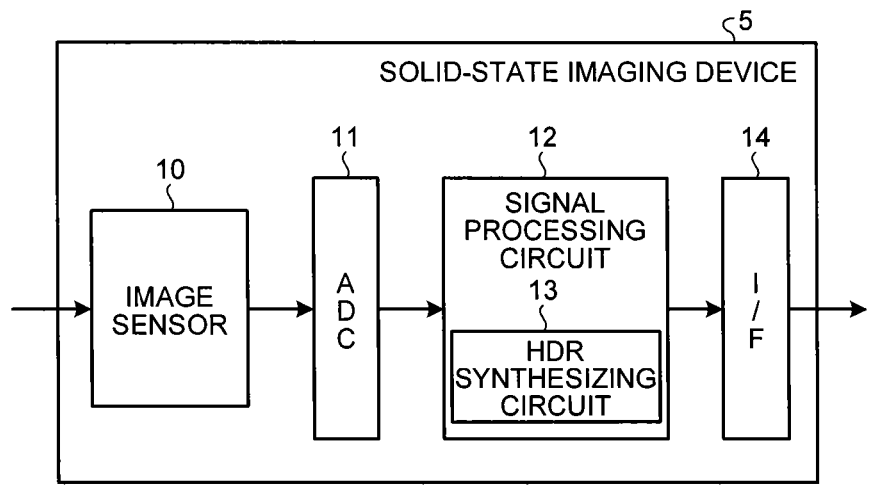
FIG. 1 is a block diagram illustrating a schematic structure of a solid-state imaging device according to an embodiment.
Figure 2:
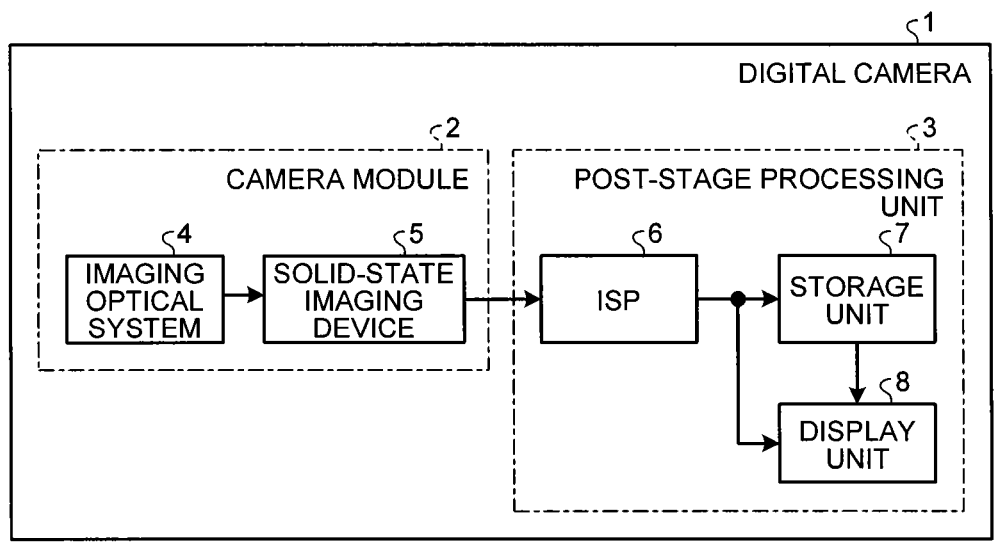
FIG. 2 is a block diagram illustrating a schematic structure of a digital camera provided with the solid-state imaging device illustrated in FIG. 1.

FIG. 1 is a block diagram illustrating a schematic structure of the solid-state imaging device according to the embodiment. FIG. 2 is a block diagram illustrating a schematic structure of a digital camera provided with the solid-state imaging device illustrated in FIG. 1.

The digital camera 1 includes a camera module 2 and a post-stage processing unit 3. The camera module 2 includes an imaging optical system 4 and the solid-state imaging device 5. The post-stage processing unit 3 includes an image signal processor (ISP) 6, a storage unit 7 and a display unit 8. The camera module 2 is applied to an electronic device such as camera-equipped portable terminal in addition to the digital camera 1.

The imaging optical system 4 takes in a light from an object, and forms an object image. The solid-state imaging device 5 shoots an object image. The ISP 6 performs signal processing on an image signal obtained by the imaging in the solid-state imaging device 5. The storage unit 7 stores an image which is subjected to the signal processing in the ISP 6. The storage unit 7 outputs an image signal to the display unit 8 in response to a user operation or the like. The display unit 8 displays the image in response to the image signal input from the ISP 6 or the storage unit 7. The display unit 8 is a liquid crystal display, for example.

The solid-state imaging device 5 is a CMOS (complementary metal oxide semiconductor) image sensor, for example. The solid-state imaging device 5 may be a CCD (charge coupled device) in addition to a CMOS image sensor. The solid-state imaging device 5 includes an image sensor 10, an analog-to-digital converter (ADC) 11, a signal processing circuit 12, and an interface (I/F) 14.

The image sensor 10 converts a light taken in by the imaging optical system 4 into signal charges by photodiode, and forms an object image. The image sensor 10 takes in the signal values of the color components of red (R), green (G), and blur (B) in an order corresponding to a Bayer arrangement, and thereby generates an analog image signal. The ADC 11 converts the image signal from the image sensor 10 from an analog system into a digital system.

The signal processing circuit 12 performs various types of signal processing on the digital image signal input from the ADC 11. The signal processing circuit 12 includes a high dynamic range (HDR) synthesizing circuit 13. The HDR synthesizing circuit 13 performs HDR synthesis on the digital image signal input into the signal processing circuit 12. The signal processing circuit 12 performs the signal processing such as defect correction, noise reduction, shading correction and white balance adjustment in addition to the HDR synthesis by the HDR synthesizing circuit 13.

The I/F 14 outputs an image signal which is subjected to the signal processing in the signal processing circuit 12. The I/F 14 may perform conversion from serial input into parallel output, or conversion from parallel input into serial output.

FIG. 3 is a diagram for explaining an arrangement of pixels in the image sensor. A pixel array 17 provided in the image sensor 10 arranges therein four pixels of Gr, R, Gb, and B as a Bayer arrangement. The R pixel detects an R light. The B pixel detects a B light. The Gr pixel and Gb pixel detect a G light. The Gr pixel is arranged in parallel with the R pixel on a horizontal line. The Gb pixel is arranged in parallel with the B pixel on a horizontal line.

The pixel array 17 is configured such that the charge accumulating periods are mutually different from each other per two horizontal lines of the Gr/R line and B/Gb line. The first charge accumulating period as a charge accumulating period of a long-time exposure line area (a first line area) 15 is longer than the second charge accumulating period as a charge accumulating period of a short-time exposure line area (a second line area) 16.

The long-time exposure line area 15 is configured of two horizontal lines (the first horizontal lines) made of long-time exposed pixels as first pixels. The short-time exposure line area 16 is configured of two horizontal lines (the second horizontal lines) made of short-time exposed pixels as second pixels. The long-time exposure line area 15 and the short-time exposure line area 16 are alternately arranged in the vertical direction.

The image sensor 10 outputs the first image signals depending on the amount of incident light into the long-time exposed pixels during the first charge accumulating period and the second image signals depending on the amount of incident light into the short-time exposed pixels during the second charge accumulating period. The HDR synthesizing circuit 13 synthesizes the first image signals and the second image signals both input into the signal processing circuit 12.

Figure 4:
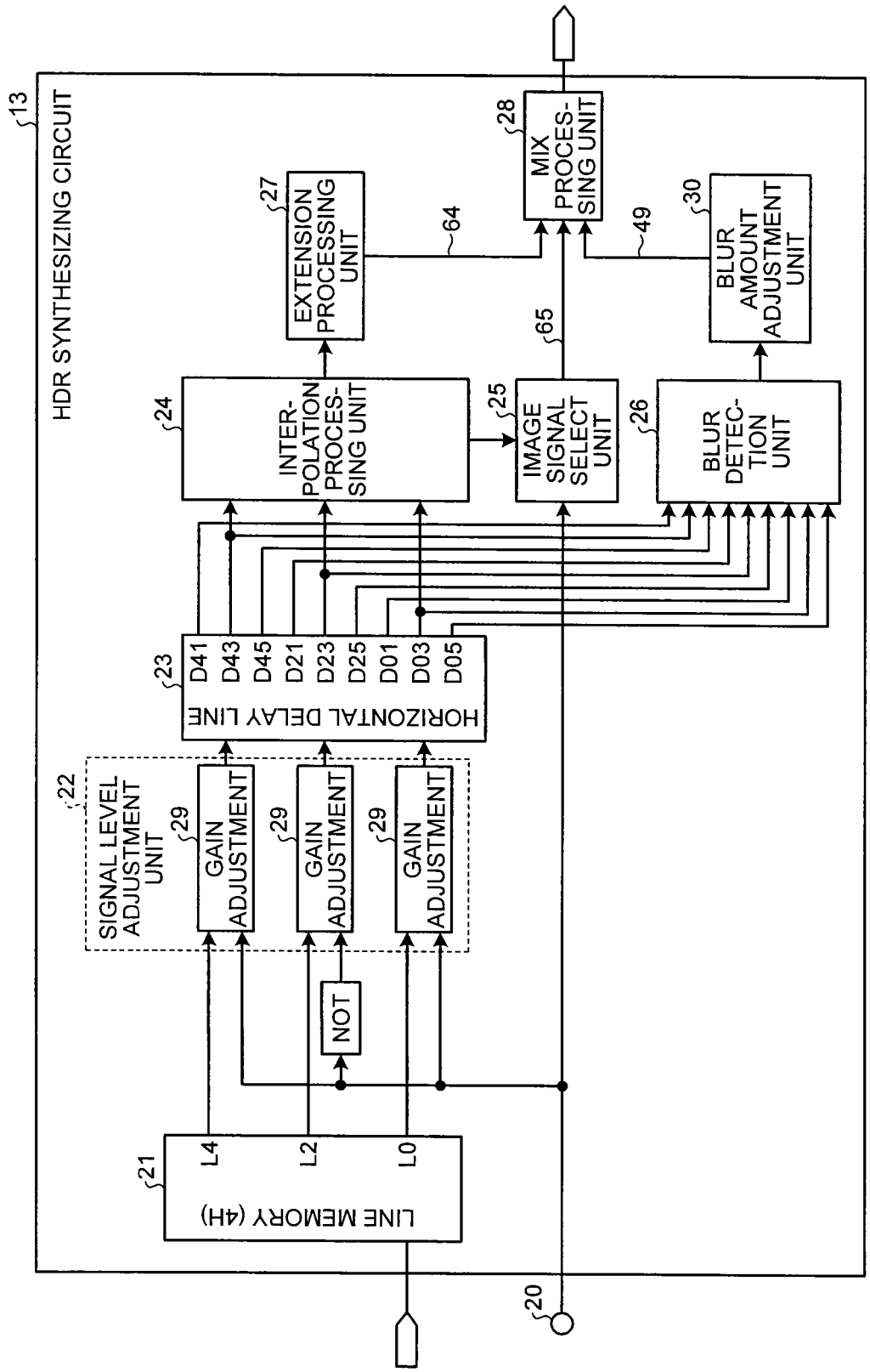
FIG. 4 is a block diagram illustrating a structure of a HDR synthesizing circuit.

FIG. 4 is a block diagram illustrating a structure of the HDR synthesizing circuit. The HDR synthesizing circuit 13 includes a line memory (4H) 21, a signal level adjustment unit 22, a horizontal delay line 23, an interpolation processing unit 24, an image signal select unit 25, a blur detection unit 26, an extension processing unit 27, a mix processing unit 28, and a blur amount adjustment unit 30.

The line memory 21 holds four lines of digital image signals input into the HDR synthesizing circuit 13. The signal level adjustment unit 22 adjusts a signal level of an image signal. The horizontal delay line 23 delays an image signal in the horizontal direction. The interpolation processing unit 24 performs interpolation processing on an image signal. The image signal select unit 25 selects a second image signal from a short-time exposed pixel among the image signals from the interpolation processing unit 24.

The blur detection unit 26 detects the amount of blur occurring in an object image. The extension processing unit 27 performs extension processing on an image signal. The blur amount adjustment unit 30 adjusts the amount of blur input into the mix processing unit 28. The mix processing unit 28 performs processing of mixing the signal subjected to the extension processing in the extension processing unit 27 and the second image signal selected in the image signal select unit 25.

FIG. 5 is a diagram for explaining output characteristics of a long-time exposed pixel and a short-time exposed pixel, and a synthesis of image signals by the HDR synthesizing circuit. For the long-time exposed pixel, when the amount of incident light exceeds a predetermined amount of saturated light, signal charges generated by photoelectrical conversion reach a photodiode accumulating capacity.

In the graph illustrated on the upper part of FIG. 5, a signal level output from the long-time exposed pixel is indicated by a solid line and a signal level output from the short-time exposed pixel is indicated by a broken line. When the amount of incident light is equal to or less than the amount of saturated light, the signal level output from the long-time exposed pixel increases in proportion to an increase in the amount of incident light. Also when the amount of incident light is larger than the amount of saturated light for the long-time exposed light, the signal level output from the short-time exposed pixel increases in proportion to an increase in the amount of incident light.

The signal level adjustment unit 22 multiplies the second image signal obtained by the short-time exposed pixel by a predetermined gain in order to match the output level between the long-time exposed pixel and the short-time exposed pixel. The gain corresponds to an exposure ratio which is a ratio between the first charge accumulating period of the long-time exposed pixel and the second charge accumulating period of the short-time exposed pixel.

The interpolation processing unit 24 adds the first image signal obtained by the long-time exposed pixel and the second image signal which is obtained by the short-time exposed pixel and whose signal level is adjusted in the signal level adjustment unit 22. In the graph illustrated in the middle part of FIG. 5, the signal level which is added in the interpolation processing unit 24 is indicated by a solid line.

The signal level which is added in the interpolation processing unit 24 indicates different characteristics before and after the amount of change for the amount of incident light exceeds the amount of saturated light (knee characteristics). The extension processing unit 27 performs extension processing on the signal level exceeding an output saturation level corresponding to the amount of saturated light by the interpolation processing in the interpolation processing unit 24 (knee extension). Thereby, the HDR synthesizing circuit 13 obtains a HDR synthesizing signal having a close linear property above and below the amount of saturated light. In the graph illustrated in the lower part of FIG. 5, the signal level subjected to the extension processing in the extension processing unit 27 is indicated by a solid line.

As illustrated in FIG. 4, the signal level adjustment unit 22 is input with three lines L0, L2 and L4 including the image signals from the same-color pixels among four horizontal lines (assumed as lines L1 to L4) held in the line memory 21 and one immediately-previous horizontal line (assumed as line L0) held in the line memory 21.

The signal level adjustment unit 22 includes three gain adjustment circuits 29 corresponding to the input lines, respectively. The gain adjustment circuit 29 makes gain adjustment by multiplication of an exposure ratio on the second image signal from the short-time exposure line area 16 (see FIG. 3) among the three horizontal lines.

A line identification count 20 is a signal indicating whether the center line L2 among the three horizontal lines is the first image signal from the long-time exposure line area 15 or the second image signal from the short-time exposure line area 16. For example, it is assumed that the line identification count 20 is "1" when the line L2 is the first image signal and the line identification count 20 is "0" when the line L2 is the second image signal.

The gain adjustment circuit 29 into which the line L2 is input in the signal level adjustment unit 22 is input with the line identification count 20 which is subjected to inversion (NOT). The gain adjustment circuits 29 into which the lines L0 and L4 other than the line L2 are input are input with the line identification count 20 which is not subjected to inversion.

Figure 6:
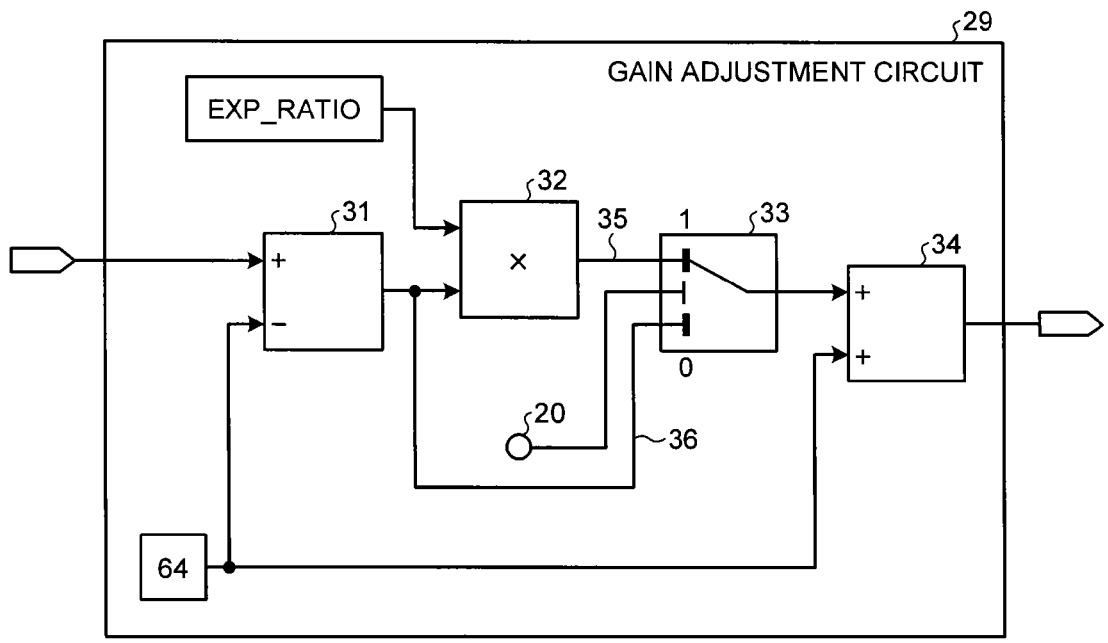
FIG. 6 is a block diagram illustrating a structure of a gain adjustment circuit.

FIG. 6 is a block diagram illustrating a structure of the gain adjustment circuit. A subtractor 31 subtracts a predetermined black level (such as 64 LSB) from an input line. A multiplier 32 multiplies an output from the subtractor 31 by an exposure ratio (EXP_RATIO).

A selector 33 selects either a signal 35 from the multiplier 32 or a signal 36 from the subtractor 31 with the line identification count 20 input into the gain adjustment circuit 29 as a select control input signal. The selector 33 selects the signal 35 multiplied by EXP_RATIO by the multiplier 32 for the select control input signal "1." The selector 33 selects the signal 36 before the multiplication of EXP_RATIO for the select control input signal "0." An adder 34 adds the select result by the selector 33 and the black level. The gain adjustment circuit 29 outputs the addition result by the adder 34.

When the line L2 is the first image signal from the long-time exposure line area 15, the HDR synthesizing circuit 13 is input with "1" as the line identification count 20. In this case, both the lines L0 and L4 are the second image signals from the short-time exposure line area 16.

In this case, the gain adjustment circuit 29 for the line L2 is input with the line identification count 20 inverted from "1" to "0." In the gain adjustment circuit 29 for the line L2, the selector 33 selects the signal 36 before the multiplication of EXP_RATIO. The gain adjustment circuit 29 for the line L0 and the gain adjustment circuit 29 for the line L4 are input with the line identification count 20 with "1." In the gain adjustment circuit 29 for the line L0 and the gain adjustment circuit 29 for the line L4, the selector 33 selects the signal 35 multiplied by EXP_RATIO.

When the line L2 is the second image signal from the short-time exposure line area 16, the HDR synthesizing circuit 13 is input with "0" as the line identification count 20. In this case, both the lines L0 and L4 are the first image signals from the long-time exposure line area 15.

In this case, the gain adjustment circuit 29 for the line L2 is input with the line identification count 20 inverted from "0" to "1." In the gain adjustment circuit 29 for the line L2, the selector 33 selects the signal 35 multiplied by EXP_RATIO. In the gain adjustment circuit 29 for the line L0 and the gain adjustment circuit 29 for the line L4, the selector 33 selects the signal 36 before the multiplication of EXP_RATIO.

Thereby, the signal level adjustment unit 22 selectively multiplies the second image signal out of the first and second image signals by an exposure ratio, and matches the output level of the long-time exposed pixel with the output level of the short-time exposed pixel. For example, when an image signal output from the image sensor 10 is of 10 bits and its EXP_RATIO is 16 times, the number of output bits of 14 bits for the synthesized image can be obtained.

Figure 7:
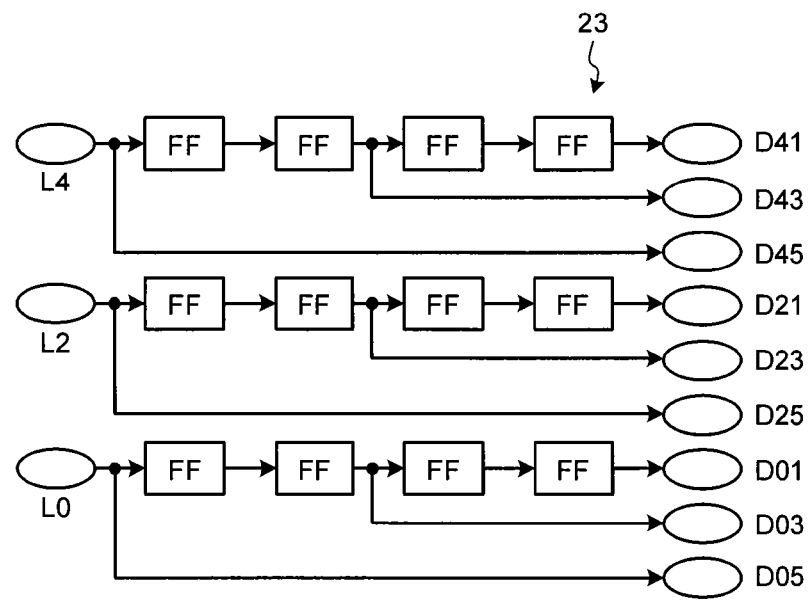
FIG. 7 is a block diagram illustrating a structure of horizontal delay lines.

FIG. 7 is a block diagram illustrating a structure of horizontal delay lines. A flip-flop (FF) holds a signal per pixel. The horizontal delay lines 23 hold the signals of four pixels for the lines L0, L2 and L4, respectively, and perform horizontal delay thereon.

FIG. 8 is a diagram for explaining target pixels at the same time on the horizontal delay line. The horizontal delay line 23 arranges a signal of a target pixel for HDR synthesis and signals of eight peripheral pixels at the same time. The peripheral pixels are contained in a 5×5 pixel block about the target pixel and which are of the same color as the target pixel.

In the illustrated example, the pixel P23 is a target pixel positioned at the center of five pixels arranged in parallel on the line L2. The pixels P41, P43, P45, P21, P25, P01, P03, and P05 are peripheral pixels when the pixel P23 is a target pixel. D41, D43, D45, D21, D23, D25, D01, D03, and D05 are the signals of the pixels P41, P43, P45, P21, P23, P25, P01, P03, and P05, respectively.

Figure 9:
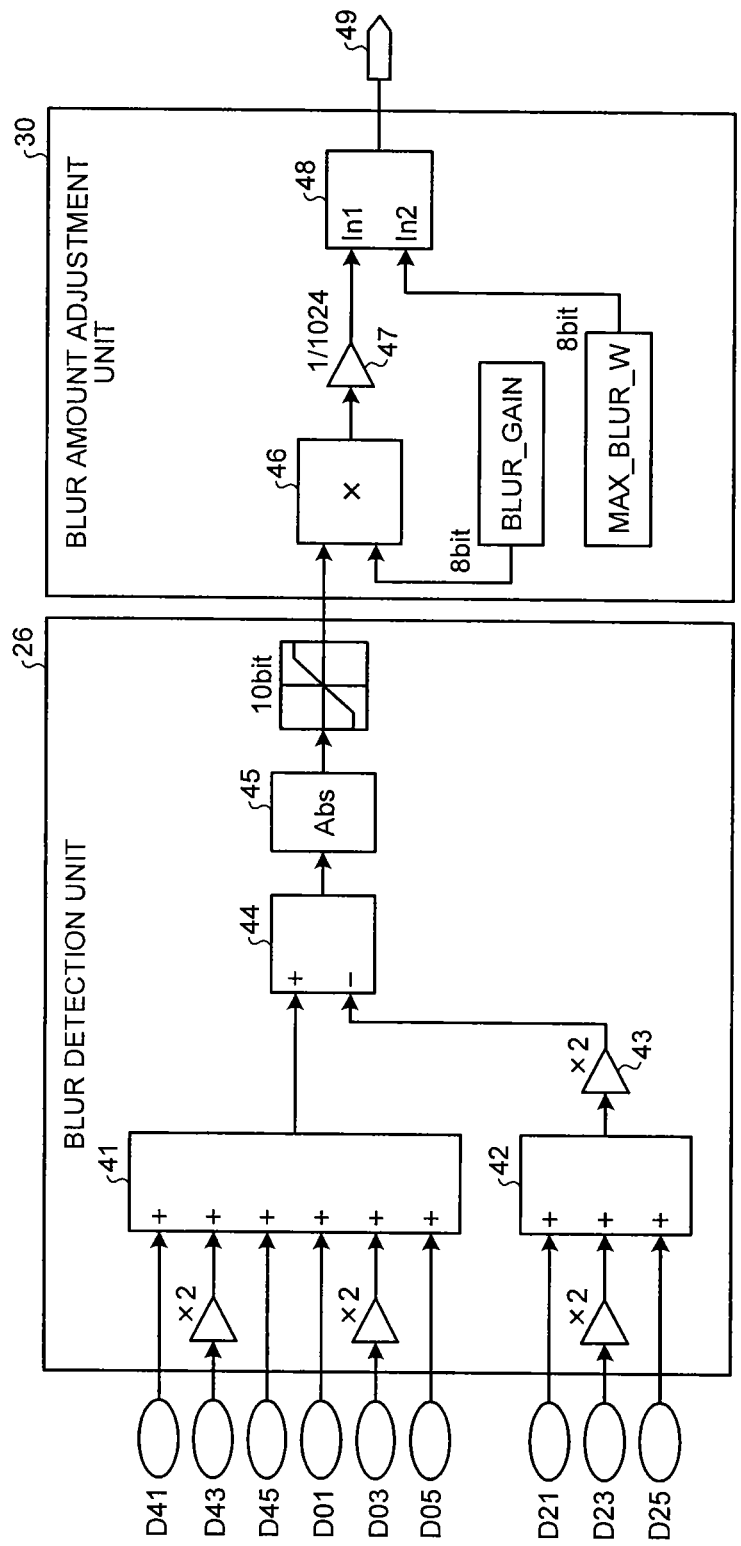
FIG. 9 is a block diagram illustrating the structures of a blur detection unit and a blur amount adjustment unit.

FIG. 9 is a block diagram illustrating the structures of the blur detection unit and the blur amount adjustment unit. The blur detection unit 26 is input with signals of nine pixels arranged at the same time on the horizontal delay line 23. The signals D41, D43, and D45 of the pixels P41, P43, and P45 on the line L4 are input into an adder 41 with the doubled signal D43 of the center pixel P43. The signals D01, D03, and D05 of the pixels P01, P03, and P05 on the line L0 are input into the adder 41 with the doubled signal D03 of the center pixel P03.

The adder 41 adds D41, D43, D45, D01, D03, and D05. The adder 41 smoothes the signals on the lines L4 and L0 in the horizontal direction thereby to restrict a noise influence on detection of the amount of blur.

The signals D21, D23, and D25 of the pixels P21, P23, and P25 on the line L2 are input into an adder 42 with the doubled signal D23 of the target pixel P23. The adder 42 adds D21, D23, and D25. The adder 42 smoothes the signals on the line L2 in the horizontal direction thereby to restrict a noise influence on detection of the amount of blur. A multiplier 43 doubles the addition result for the line L2 in the adder 42. The structure for smoothing in the blur detection unit 26 may be changed as needed.

A subtractor 44 subtracts the multiplication result for the line L2 in the multiplier 43 from the addition result for the lines L4 and L0 in the adder 41. An absolute value calculator (Abs) 45 calculates an absolute value of the subtraction result in the subtractor 44. A 10-bit signal is input from the absolute value calculator 45 into a multiplier 46.

The blur detection unit 26 assumes an absolute value of a difference between the signals on the line L2 containing the target pixel and the signals on the lines L4 and L0 positioned above and below the line L2 and containing the peripheral pixels as an estimated value of the amount of blur in the object image. In the present embodiment, the amount of blur corresponds to a difference between the signal levels of the line L2 containing the target pixel, and the lines L4 and L0 with a different charge accumulating period from the line L2 and above and below the line L2, whose signal levels are adjusted in the signal level adjustment unit 22. The blur detection unit 26 uses the first image signal and the second image signal which are smoothed in the horizontal direction for detecting the amount of blur.

When the pixel P23 as the target pixel is a long-time exposed pixel, the blur detection unit 26 estimates, as the amount of blur for the pixel P23, a difference between the first image signals from the long-time exposed pixels P21, P23, and P25 on the line L2 containing the pixel P23 and the second image signals from the short-time exposed pixels P41, P43, P45, P01, P03, and P05 on the lines L4 and L0. The lines L4 and L0 are the second horizontal line positioned near the line L2 as the first horizontal line.

When the pixel P23 as the target pixel is a short-time exposed pixel, the blur detection unit 26 estimates, as the amount of blur for the pixel P23, a difference between the second image signals from the short-time exposed pixels P21, P23, and P25 on the line L2 containing the pixel P23 and the first image signals from the long-time exposed pixels P41, P43, P45, P01, P03, and P05 on the lines L4 and L0. The lines L4 and L0 are the first horizontal line positioned near the line L2 as the second horizontal line.

The blur amount adjustment unit 30 adjusts the amount of blur detected in the blur detection unit 26 in order to adjust the second image signals to be added in the mix processing in the mix processing unit 28. The multiplier 46 multiplies the 10-bit signal from the absolute value calculator 45 by an 8-bit blur gain (BLUR_GAIN). The multiplier 46 adjusts a gain of the amount of blur by the multiplication of BLUR_GAIN.

The blur amount adjustment unit 30 adjusts the amount of the added second image signals in the mix processing unit 28 to a desired level through adjustment of the amount of blur using BLUR_GAIN. BLUR_GAIN is set as needed depending on the output characteristics of the desired HDR synthesizing signal, for example.

A multiplier 47 multiplies the multiplication result of the multiplier 46 by 1/1024 to obtain an 8-bit signal. A clip circuit 48 performs clip processing using a preset upper limit (MAX_BLUR_W) on the amount of blur. MAX_BLUR_W is set depending on a level of SNR which is permitted for the HDR synthesizing signal, for example.

The clip circuit 48 compares the signal (In1) from the multiplier 47 with 8-bit MAX_BLUR_W (In2). For example, when In1>In2 is established, the clip circuit 48 outputs the signal (In1) from the multiplier 47. When In1>In2 is not established, the clip circuit 48 outputs MAX_BLUR_W (In2). The blur amount adjustment unit 30 outputs a signal 49 from the clip circuit 48.

The blur amount adjustment unit 30 is not limited to the gain adjustment by gain multiplication and the clip processing by an upper limit. The blur amount adjustment unit 30 may perform one of the gain adjustment and the clip processing. The HDR synthesizing circuit 13 may omit the blur amount adjustment unit 30. The HDR synthesizing circuit 13 may input the amount of blur detected by the blur detection unit 26 into the mix processing unit 28 without adjusting the same.

Figure 10:
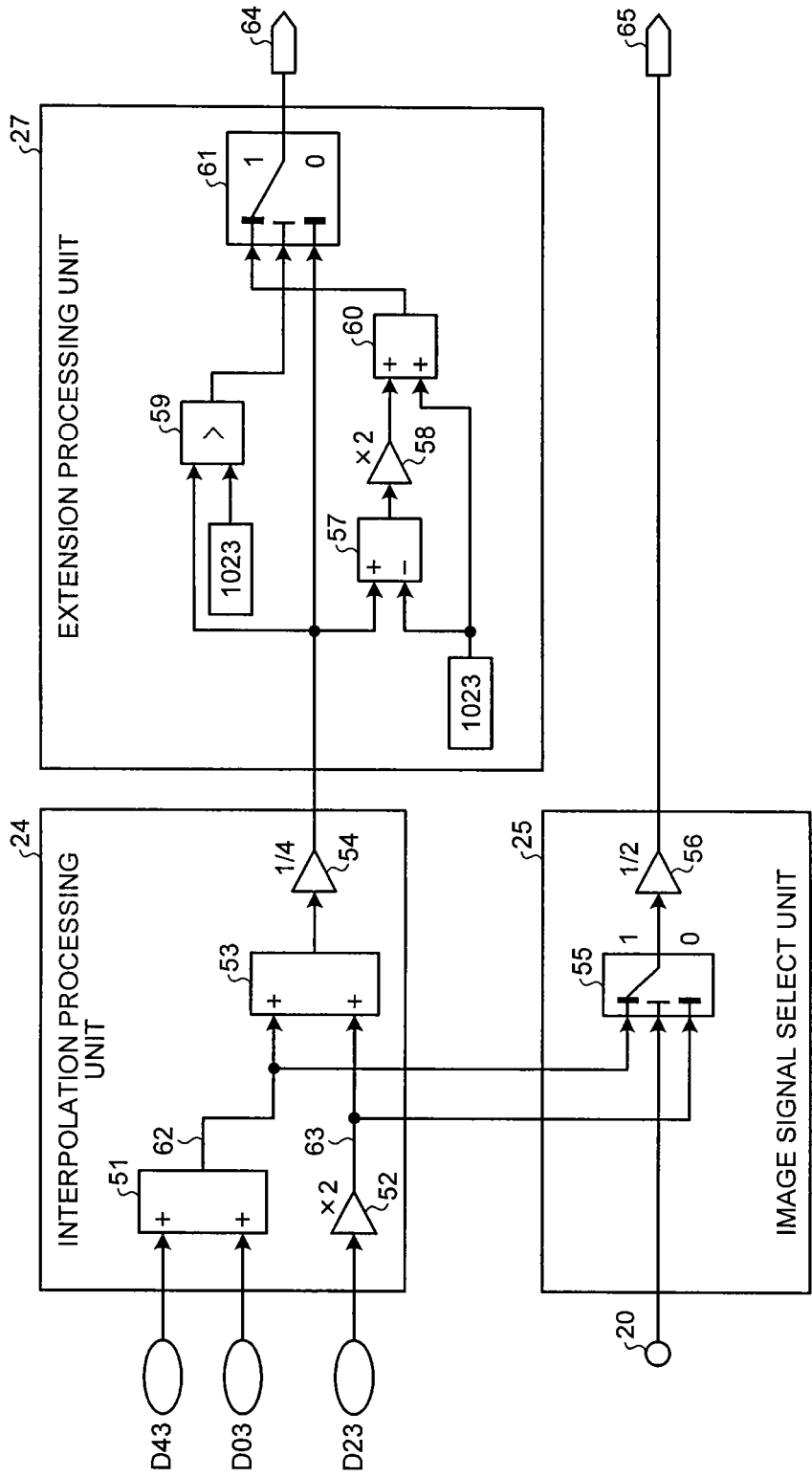
FIG. 10 is a block diagram illustrating the structures of an interpolation processing unit, an image signal select unit, and an extension processing unit.

FIG. 10 is a block diagram illustrating the structures of the interpolation processing unit, the image signal select unit, and the extension processing unit. The interpolation processing unit 24 is input with the signal D23 of the pixel P23 as a target pixel among nine pixels arranged at the same time on the horizontal delay line 23, and the signal D43 of the pixel P43 and the signal D03 of the pixel P03 positioned in the vertical direction of the pixel P23.

A multiplier 52 doubles D23. An adder 51 adds D43 and D03. An adder 53 adds a signal 62 as an addition result of the adder 51 and a signal 63 as a multiplication result of the multiplier 52. A multiplier 54 quarters the addition result of the adder 53. The interpolation processing unit 24 outputs the multiplication result of the multiplier 54 as an interpolation signal to the extension processing unit 27. The interpolation processing unit 24 outputs the signals 62 and 63 to the image signal select unit 25.

Figure 11:
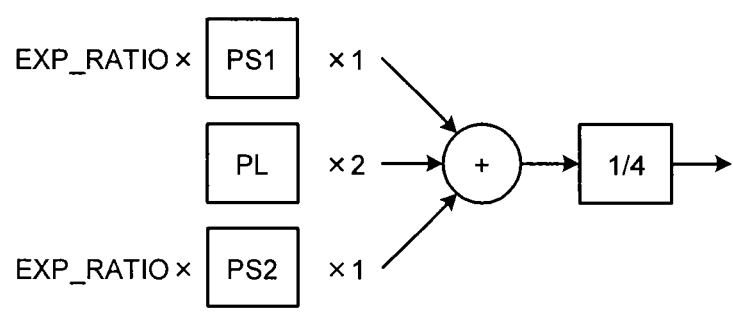
FIG. 11 is a conceptual diagram for explaining interpolation processing on a long-time exposed pixel.

FIG. 11 is a conceptual diagram for explaining the interpolation processing on long-time exposed pixels. The interpolation processing unit 24 uses, for the interpolation processing on the long-time exposed pixel PL as a target pixel, the first image signal from the long-time exposed pixel PL and the second image signals from two short-time exposed pixels PS1 and PS2 positioned near the long-time exposed pixel PL. The short-time exposed pixels PS1 and PS2 are of the same color as the long-time exposed pixel PL. The short-time exposed pixels PS1 and PS2 are arranged in parallel with the long-time exposed pixel PL via one pixel in the vertical direction, respectively.

The interpolation processing unit 24 adds the second image signal of the short-time exposed pixel PS1 multiplied by EXP_RATIO, the first image signal of the long-time exposed pixel PL, and the second image signal of the short-time exposed pixels PS2 multiplied by EXP_RATIO at a ratio of 1:2:1, and multiplies the addition by ¼. The interpolation signal output from the interpolation processing unit 24 after the interpolation processing contains 50% of the signal components from the long-time exposed pixel PL.

Figure 12:
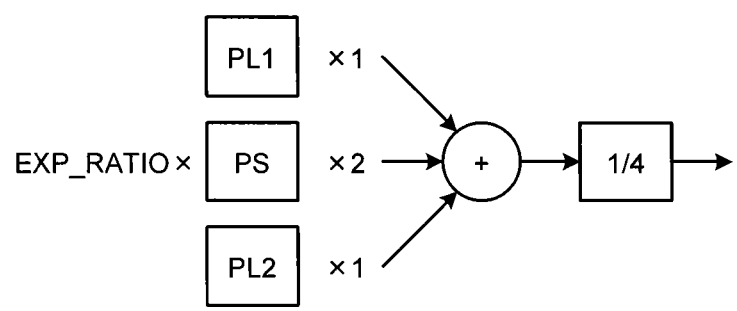
FIG. 12 is a conceptual diagram for explaining interpolation processing on a short-time exposed pixel.

FIG. 12 is a conceptual diagram for explaining the interpolation processing on short-time exposed pixels. The interpolation processing unit 24 uses, for the interpolation processing on the short-time exposed pixel PS as a target pixel, the second image signal from the short-time exposed pixel PS, and the first image signals from two long-time exposed pixels PL1 and PL2 positioned near the short-time exposed pixel PS. The long-time exposed pixels PL1 and PL2 are of the same color as the short-time exposed pixel PS. The long-time exposed pixels PL1 and PL2 are arranged in parallel with the short-time exposed pixel PS via one pixel in the vertical direction, respectively.

The interpolation processing unit 24 adds the first image signal of the long-time exposed pixel PL1, the second image signal of the short-time exposed pixel PS multiplied by EXP_RATIO, and the first image signal of the long-time exposed pixel PL2 at a ratio of 1:2:1, and further quarters the addition. The interpolation signal output from the interpolation processing unit 24 after the interpolation processing contains 50% of the signal components from the long-time exposed pixels PL1 and PL2.

When a moving object is to be shot, the solid-state imaging device 5 can obtain an object image with less blur as the exposure time is shorter. A difference of the degree of blur occurring in the object image is present between the long-time exposed pixel and the short-time exposed pixel. When the long-time exposed pixel and the short-time exposed pixel are applied, a ratio between the signal components from the long-time exposed pixel and the signal components from the short-time exposed pixel may largely change before and after the amount of incident light reaches the amount of saturated light.

The interpolation processing unit 24 performs the interpolation processing of uniformly containing the signal components from the long-time exposed pixel and the signal components from the short-time exposed pixel. Even when the ratio between the first image signal and the second image signal changes, the interpolation processing unit 24 can secure sufficient continuity of the interpolation signal for the amount of incident light.

Thereby, the HDR synthesizing circuit 13 can perform the HDR synthesis for restricting a variation in the amount of change above or below the amount of saturated light for the signal level relative to the amount of incident light. The solid-state imaging device 5 restricts a variation in the signal level unnecessary for the HDR synthesis, thereby reducing failures such as false color when a moving object is shot. Thereby, the solid-state imaging device 5 can obtain a high-quality image.

The image signal select unit 25 selects the second image signal out of the signal 62 from the adder 51 and the signal 63 from the multiplier 52 in the interpolation processing unit 24. A selector 55 selects either of the signals 62 and 63 with the line identification count 20 as a select control input signal. The selector 55 selects the signal 62 as the addition result of D43 and D03 for the select control input signal "1." The selector 55 selects the signal 63 as the multiplication result of D23 for the select control input signal "0." Thereby, the selector 55 always outputs the second image signal from the short-time exposed pixel. A multiplier 56 multiplies the select result of the selector 55 by ½. The image signal select unit 25 outputs the multiplication result of the multiplier 56 as a signal 65.

The extension processing unit 27 performs extension processing on the interpolation signal which is subjected to the interpolation processing in the interpolation processing unit 24. A comparator 59 compares the interpolation signal input into the extension processing unit 27 with a predetermined output saturation level (such as 1023 LBS). When the interpolation signal input into the extension processing unit 27 is larger than the output saturation level, the comparator 59 outputs "1" as a comparison result, for example. When the interpolation signal input into the extension processing unit 27 is equal to or less than the output saturation level, the comparator 59 outputs "0" as a comparison result, for example.

A subtractor 57 subtracts the output saturation level from the interpolation signal input into the extension processing unit 27. A multiplier 58 multiplies the subtraction result of the subtractor 57 by a magnification of extension of 2. The multiplier 58 performs multiplication for the extension processing on the signal level exceeding the output saturation level due to the interpolation processing in the interpolation processing unit 24. An adder 60 adds the output saturation level to the multiplication result of the multiplier 58.

A selector 61 selects either the signal from the adder 60 or the interpolation signal input into the extension processing unit 27 with the comparison result from the comparator 59 as a select control input signal. The selector 61 selects the signal output from the adder 60 after the extension processing using the multiplier 58 for the select control input signal "1." The selector 61 selects the interpolation signal before the extension processing for the select control input signal "0."

Thereby, the extension processing unit 27 performs processing of extending an excess amount of the output saturation level with the signal having a higher level than the output saturation level due to the HDR synthesis as a target. The extension processing unit 27 outputs a signal 64 selected in the selector 61.

Figure 13:
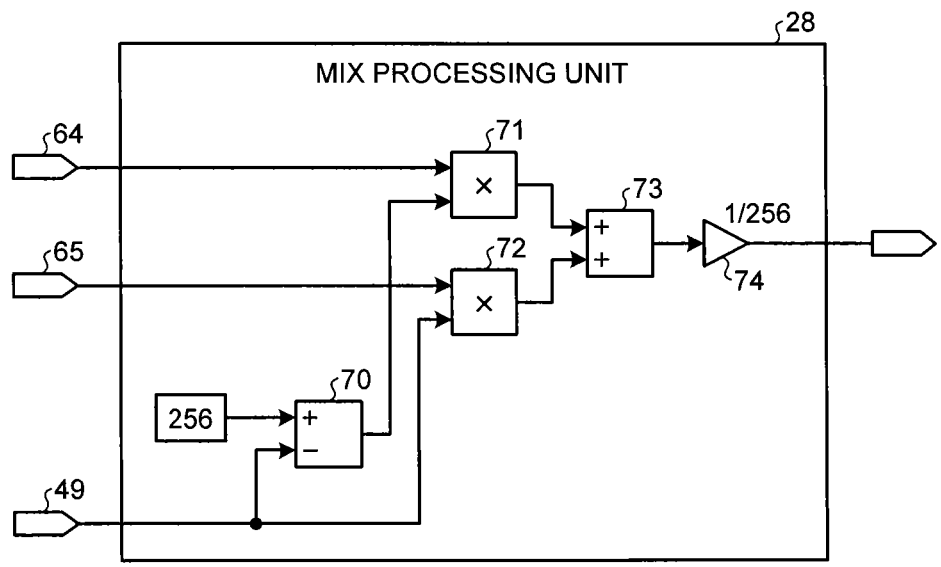
FIG. 13 is a block diagram illustrating a structure of a mix processing unit.

FIG. 13 is a block diagram illustrating a structure of the mix processing unit. The mix processing unit 28 applies a weight of the second image signal depending on the amount of blur to the signal 64 through the processing of mixing the second image signal (the signal 65) into the signal 64 from the extension processing unit 27. The mix processing unit 28 is input with the signal 64 from the extension processing unit 27, the signal 65 from the image signal select unit 25, and the signal 49 from the blur amount adjustment unit 30.

A subtractor 70 subtracts the signal 49 input from the blur amount adjustment unit 30 into the mix processing unit 28 from the output saturation level (256 LBS) converted into 8 bits. A multiplier 71 multiplies the signal 64 input from the extension processing unit 27 into the mix processing unit 28 by the subtraction result of the subtractor 70.

A multiplier 72 multiplies the signal 65 input from the image signal select unit 25 into the mix processing unit 28 by the signal 49 input from the blur amount adjustment unit 30 into the mix processing unit 28. An adder 73 adds the multiplication result of the multiplier 71 and the multiplication result of the multiplier 72. A multiplier 74 multiplies the addition result of the adder 73 by ¹⁄₂₅₆. The mix processing unit 28 outputs the multiplication result of the multiplier 74. The HDR synthesizing circuit 13 outputs the signal from the mix processing unit 28 as a synthesized image signal.

Figure 14:
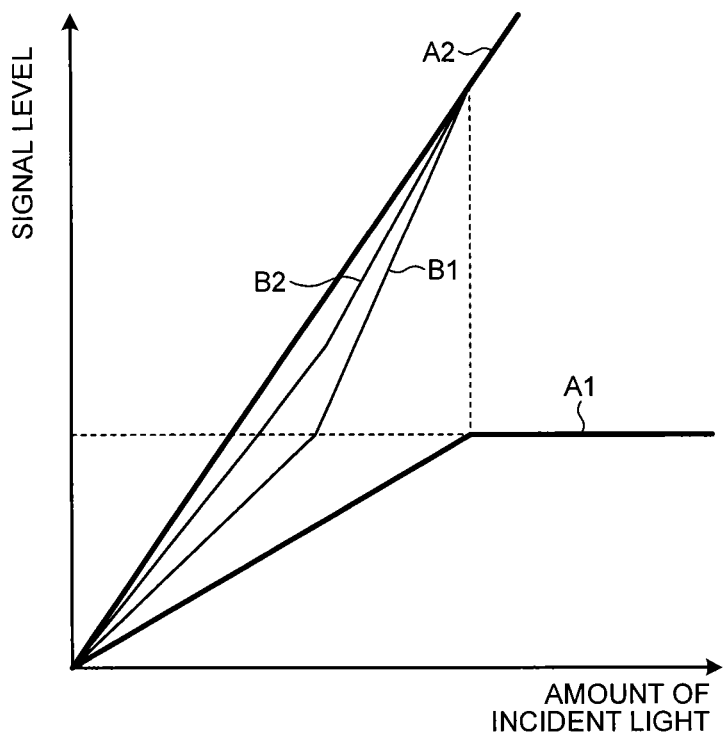
FIG. 14 is a diagram for explaining output characteristics of a long-time exposed pixel and a short-time exposed pixel, and a synthesis of image signals by the HDR synthesizing circuit.

FIG. 14 is a diagram for explaining output characteristics of a long-time exposed pixel and a short-time exposed pixel, and a synthesis of image signals by the HDR synthesizing circuit. The solid line A1 indicates a relationship between the amount of incident light into the long-time exposed pixel and the level of the first image signal. The solid line A2 indicates a relationship between the amount of incident light into the short-time exposed pixel and the level of the second image signal adjusted by the exposure ratio EXP_RATIO.

The solid line B1 indicates a relationship between the amount of incident light and the level of the interpolation signal after the interpolation processing in the interpolation processing unit 24. The interpolation signal contains 50% of the signal components from the long-time exposed pixel. The solid line B2 indicates a relationship between the amount of incident light and the level of the synthesized image signal after the mix processing in the mix processing unit 28.

When the output characteristics are largely different between the long-time exposed pixel and the short-time exposed pixel due to a motion of the object, the interpolation signal may largely change in its linear characteristics above and below the amount of saturation light. In the graph, the solid line is largely bent at the output saturation level. In this case, a false color easily occurs in the synthesized image. Blur occurring in the synthesized image is desirably reduced as much as possible.

Since the short-time exposed pixel is set to be shorter in the charge accumulating period than the long-time exposed pixel, the short-time exposed pixel is more excellent in a reaction to a change in luminance than the long-time exposed pixel. The HDR synthesizing circuit 13 performs the mix processing of largely weighting the second image signal from the short-time exposed pixel as the amount of blur increases. As the amount of blur is more, the HDR synthesizing circuit 13 further increases a ratio of output from the short-time exposed pixel sensitive to a motion of the object than the long-time exposed pixel. Thereby, the HDR synthesizing circuit 13 can prevent blur from occurring in a synthesized image.

The HDR synthesizing circuit 13 changes the output characteristics of the HDR synthesizing signal as needed by the gain adjustment using BLUR_GAIN. The HDR synthesizing circuit 13 reduces failures such as false color by weighting the second image signal for reducing a change in characteristics at the output saturation level. The HDR synthesizing circuit 13 restricts a deterioration in SNR by the clip processing using MAX_BLUR_W.

The HDR synthesizing circuit 13 makes the HDR synthesis using the first image signal from the long-time exposed pixel and the second image signal from the short-time exposed pixel, thereby further restricting blur in an object image as compared with synthesizing of images of multiple frames. The HDR synthesizing circuit 13 performs the interpolation processing on the output from the long-time exposure line area 15 and the output from the short-time exposure line area 16, thereby obtaining a synthesized image without lowering a resolution of the image sensor 10.

From the above, the HDR synthesizing circuit 13 can prevent blur from occurring in a synthesized image and can perform effective dynamic range synthesis. FIG. 14 indicates a relationship when the luminance of the short-time exposed pixel changes to be brighter due to a motion of an object. The HDR synthesizing circuit 13 performs the similar processing both when the luminance of the short-time exposed pixel changes to be brighter due to a motion of the object and when the luminance of the short-time exposed pixel changes to be darker.

Each circuit structure explained in the present embodiment may be configured to realize the functions explained in the present embodiment, and may be changed as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising a high dynamic range synthesizing circuit configured to synthesize a first image signal depending on the amount of incident light into a first pixel during a first charge accumulating period and a second image signal depending on the amount of incident light into a second pixel during a second charge accumulating period shorter than the first charge accumulating period,
   wherein the high dynamic range synthesizing circuit includes:
   a signal level adjustment unit configured to adjust a signal level of the second image signal according to a ratio between the first charge accumulating period and the second charge accumulating period;
   an interpolation processing unit configured to be input with the first image signal and the second image signal a signal level of which is adjusted in the signal level adjustment unit, and to generate an interpolation signal;
   a blur detection unit configured to detect the amount of blur generated in an object image by use of the first image signal and the second image signal a signal level of which is adjusted in the signal level adjustment unit; and
   a mix processing unit configured to apply a weight of the second image signal depending on the amount of blur to the interpolation signal by processing of mixing the second image signal into the interpolation signal, and
   the interpolation processing unit generates the interpolation signal by interpolation processing using the second image signals from the second pixels as peripheral pixels positioned around the first pixel as a target pixel for the first pixel as the target pixel, and
   generates the interpolation signal by interpolation processing using the first image signals from the first pixels as peripheral pixels positioned around the second pixel as a target pixel for the second pixel as the target pixel.

2. The image processing device according to claim 1,
   wherein the blur detection unit estimates, as the amount of blur in the first pixel as the target pixel, a difference between the first image signals from the first pixels on a first horizontal line containing the first pixel as the target pixel and the second image signals from the second pixels on a second horizontal line positioned near the first horizontal line, and
   estimates, as the amount of blur in the second pixel as the target pixel, a difference between the second image signals from the second pixels on the second horizontal line containing the second pixel as the target pixel and the first image signals from the first pixels on the first horizontal line positioned near the second horizontal line.

3. The image processing device according to claim 1, wherein the blur detection unit uses the first image signal and the second image signal which are smoothed in the horizontal direction for detecting the amount of blur.

4. The image processing device according to claim 1, wherein the interpolation processing unit generates the interpolation signal at an equal ratio between the first image signal and the second image signal the signal level of which is adjusted in the signal level adjustment unit.

5. The image processing device according to claim 1, wherein the high dynamic range synthesizing circuit further includes a blur amount adjustment unit configured to make a gain adjustment by gain multiplication on the amount of blur input into the mix processing unit.

6. The image processing device according to claim 1, wherein the high dynamic range synthesizing circuit further includes a blur amount adjustment unit configured to perform clip processing by a preset upper limit on the amount of blur input into the mix processing unit.

7. The image processing device according to claim 1, wherein the mix processing unit performs the mix processing of increasing a weight of the second image signal as the amount of blur increases.

8. The image processing device according to claim 1, wherein the peripheral pixels are eight pixels included in a pixel block centering on the target pixel and are pixels with the same color as that of the target pixel.

9. The image processing device according to claim 1,
   wherein the high dynamic range synthesizing circuit further includes an extension processing unit configured to perform extension processing on a signal level exceeding an output saturation level at which output charges relative to the amount of incident light during the first charge accumulating period are saturated in the interpolation signal, and
   the mix processing unit performs the mix processing on the interpolation signal after the extension processing in the extension processing unit and the second image signal.

10. An image processing method comprising a high dynamic range synthesis of synthesizing a first image signal depending on the amount of incident light into a first pixel during a first charge accumulating period and a second image signal depending on the amount of incident light into a second pixel during a second charge accumulating period shorter than the first charge accumulating period, wherein the high dynamic range synthesis includes:

adjusting a signal level of the second image signal according to a ratio between the first charge accumulating period and the second charge accumulating period;

generating an interpolation signal by use of the first image signal, and the second image signal the signal level of which is adjusted;

detecting the amount of blur occurring in an object image by use of the first image signal, and the second image signal the signal level of which is adjusted; and applying a weight of the second image signal depending on the amount of blur to the interpolation signal by processing of mixing the second image signal into the interpolation signal, and generating the interpolation signal performs:

interpolation processing using the second image signals from the second pixels as peripheral pixels positioned around the first pixel as a target pixel for the first pixel as the target pixel; and interpolation processing using the first image signals from the first pixels as peripheral pixels positioned around the second pixel as a target pixel for the second pixel as the target pixel.

11. The image processing method according to claim 10, wherein detecting the amount of blur estimates, as the amount of blur in the first pixel as the target pixel, a difference between the first image signals from the first pixels on a first horizontal line containing the first pixel as the target pixel and the second image signals from the second pixels on a second horizontal line positioned near the first horizontal line; and estimates, as the amount of blur in the second pixel as the target pixel, a difference between the second image signals from the second pixels on the second horizontal line containing the second pixel as the target pixel and the first image signals from the first pixels on the first horizontal line positioned near the second horizontal line.

12. The image processing method according to claim 10, wherein the first image signal and the second image signal smoothed in the horizontal direction are used for detecting the amount of blur.

13. The image processing method according to claim 10, wherein the interpolation signal is generated at an equal ratio between the first image signal and the second image signal the signal level of which is adjusted.

14. The image processing method according to claim 10, wherein the amount of blur subjected to gain adjustment by gain multiplication is used in the mix processing.

15. The image processing method according to claim 10, wherein the amount of blur subjected to clip processing by a preset upper limit is used in the mix processing.

16. The image processing method according to claim 10, comprising performing the mix processing of increasing a weight of the second image signal as the amount of blur increases.

17. The image processing method according to claim 10, wherein the peripheral pixels are eight pixels included in a pixel block centering on the target pixel and are pixels with the same color as that of the target pixel.

18. The image processing method according to claim 10, wherein the high dynamic range synthesizing further includes:

performing extension processing on a signal level exceeding an output saturation level at which output charges relative to the amount of incident light during the first charge accumulating period are saturated in the interpolation signal; and performing the mix processing on the interpolation signal subjected to the extension processing, and the second image signal.

19. A solid-state imaging device comprising:

a pixel array containing first pixels for detecting the amount of incident light during a first charge accumulating period and second pixels for detecting the amount of incident light during a second charge accumulating period shorter than the first charge accumulating period; and a high dynamic range synthesizing circuit configured to synthesize a first image signal output by the first image pixel depending on the amount of incident light and a second image signal output by the second pixel depending on the amount of incident light, wherein the high dynamic range synthesizing circuit includes:

a signal level adjustment unit configured to adjust a signal level of the second image signal according to a ratio between the first charge accumulating period and the second charge accumulating period;

an interpolation processing unit configured to be input with the first image signal and the second image signal a signal level of which is adjusted in the signal level adjustment unit, and to generate an interpolation signal;

a blur detection unit configured to detect the amount of blur occurring in an object image by use of the first image signal and the second image signal a signal level of which is adjusted in the signal level adjustment unit; and a mix processing unit configured to apply a weight of the second image signal depending on the amount of blur to the interpolation signal by processing of mixing the second image signal into the interpolation signal, and the interpolation processing unit generates the interpolation signal by interpolation processing using the second image signals from the second pixels as peripheral pixels positioned around the first pixel as a target pixel for the first pixel as the target pixel, and generates the interpolation signal by interpolation processing using the first image signals from the first pixels as peripheral pixels positioned around the second pixel as a target pixel for the second pixel as the target pixel.

20. The solid-state imaging device according to claim 19, wherein the pixel array alternately arranges in the vertical direction therein a first line area in which the first pixels are arranged in parallel in the horizontal direction and a second line area in which the second pixels are arranged in parallel in the horizontal direction, and the interpolation processing unit performs the interpolation processing using the second image signals from the second pixels as the peripheral pixels contained in the second line area adjacent to the first line area containing the first pixel as a target pixel for the first pixel as the target pixel, and performs the interpolation processing using the first image signals from the first pixels as the peripheral pixels contained in the first line area adjacent to the second line area containing the second pixel as a target pixel for the second pixel as the target pixel.

* * * * *